(12) United States Patent
White

(10) Patent No.: US 10,939,177 B2
(45) Date of Patent: *Mar. 2, 2021

(54) SYSTEM FOR PRESENTING MEDIA CONTENT

(71) Applicant: AT&T Intellectual Property I, L.P., Atlanta, GA (US)

(72) Inventor: Scott White, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 12 days.

This patent is subject to a terminal disclaimer.

(21) Appl. No.: 15/912,125

(22) Filed: Mar. 5, 2018

(65) Prior Publication Data

US 2018/0199109 A1 Jul. 12, 2018

Related U.S. Application Data

(63) Continuation of application No. 14/755,059, filed on Jun. 30, 2015, now Pat. No. 9,942,613, which is a
(Continued)

(51) Int. Cl.
*H04N 21/482* (2011.01)
*H04N 21/422* (2011.01)
(Continued)

(52) U.S. Cl.
CPC ....... *H04N 21/482* (2013.01); *H04N 7/17318* (2013.01); *H04N 21/4143* (2013.01); *H04N 21/41265* (2020.08); *H04N 21/42209* (2013.01); *H04N 21/44218* (2013.01); *H04N 21/44222* (2013.01); *H04N 21/4532* (2013.01);
(Continued)

(58) Field of Classification Search
CPC ....... H04N 21/42204; H04N 21/42207; H04N 21/42209; H04N 21/44204; H04N 21/42218; H04N 21/44222; H04N 21/482; H04N 21/41265; H04N 21/4143; H04N 21/4532; H04N 21/472; H04N 21/4722; H04N 21/4725; H04N 21/4786;
(Continued)

(56) References Cited

U.S. PATENT DOCUMENTS 6,177,931 B1  1/2001  Alexander
6,181,326 B1  1/2001  Takahashi
(Continued)

FOREIGN PATENT DOCUMENTS

WO  02098127  12/2002
WO  2004042525  5/2004

*Primary Examiner* — James R Sheleheda
(74) *Attorney, Agent, or Firm* — Guntin & Gust, PLC; John G. Rauch

(57) ABSTRACT

A process that incorporates teachings of the present disclosure may include, for example, selecting a media content item and constructing a tout message based on the media content item. Information associated with the media content item is included within the tout message, which includes a selectable link. The selectable link includes instructions for directing equipment of a subscriber to access the media content item without the subscriber providing additional input. A group of communication devices associated with the subscriber is identified, and the tout message is transmitted to a communication device of the group. Other embodiments are disclosed.

20 Claims, 5 Drawing Sheets

Related U.S. Application Data continuation of application No. 14/246,415, filed on Apr. 7, 2014, now Pat. No. 9,100,711, which is a continuation of application No. 13/912,424, filed on Jun. 7, 2013, now Pat. No. 8,739,224, which is a continuation of application No. 11/837,769, filed on Aug. 13, 2007, now Pat. No. 8,484,685.

(51) Int. Cl.

| | | |
|---|---|---|
| H04N 21/442 | (2011.01) | |
| H04N 21/4143 | (2011.01) | |
| H04N 21/472 | (2011.01) | |
| H04N 21/4722 | (2011.01) | |
| H04N 21/488 | (2011.01) | |
| H04N 21/4725 | (2011.01) | |
| H04N 21/858 | (2011.01) | |
| H04N 21/4786 | (2011.01) | |
| H04N 21/81 | (2011.01) | |
| H04N 7/173 | (2011.01) | |
| H04N 21/45 | (2011.01) | |
| H04N 21/41 | (2011.01) | |

(52) U.S. Cl.
CPC ....... *H04N 21/472* (2013.01); *H04N 21/4722* (2013.01); *H04N 21/4725* (2013.01); *H04N 21/4786* (2013.01); *H04N 21/4882* (2013.01); *H04N 21/812* (2013.01); *H04N 21/8133* (2013.01); *H04N 21/858* (2013.01)

(58) Field of Classification Search
CPC ............. H04N 21/4882; H04N 21/812; H04N 21/8133; H04N 7/17318
See application file for complete search history.

(56) References Cited

U.S. PATENT DOCUMENTS

| | | | |
|---|---|---|---|
| 6,437,836 B1 | 8/2002 | Huang | |
| 6,446,261 B1 | 9/2002 | Rosser | |
| 6,970,546 B2 | 11/2005 | Kent | |
| 7,003,792 B1 | 2/2006 | Yuen | |
| 7,065,184 B2 | 6/2006 | Vishik | |
| 7,216,170 B2 | 5/2007 | Ludvig | |
| 7,243,123 B1 | 7/2007 | Allen | |
| 7,280,533 B2 | 10/2007 | Khartabil | |
| 7,344,084 B2 | 3/2008 | DaCosta | |
| 7,454,775 B1 | 11/2008 | Schaffer | |
| 8,484,685 B2 * | 7/2013 | White | H04N 7/17318 725/58 |
| 8,739,224 B2 * | 5/2014 | White | H04N 7/17318 725/58 |
| 9,100,711 B2 * | 8/2015 | White | H04N 7/17318 |
| 9,942,613 B2 * | 4/2018 | White | H04N 7/17318 |
| 2001/0049718 A1 | 12/2001 | Ozawa | |
| 2002/0010932 A1 | 1/2002 | Nguyen | |
| 2003/0066085 A1 | 4/2003 | Boyer | |
| 2003/0070167 A1 | 4/2003 | Holtz | |
| 2004/0049787 A1 | 3/2004 | Maissel | |
| 2004/0199663 A1 * | 10/2004 | Horvitz | G05B 19/404 709/238 |
| 2005/0010679 A1 | 1/2005 | Yamaga | |
| 2005/0010953 A1 | 1/2005 | Carney | |
| 2005/0080864 A1 | 4/2005 | Daniell | |
| 2005/0114141 A1 | 5/2005 | Grody | |
| 2006/0105758 A1 * | 5/2006 | Maislos | H04W 48/04 455/420 |
| 2006/0264208 A1 * | 11/2006 | Moon | H04L 29/06027 455/417 |
| 2007/0042791 A1 | 2/2007 | Watler | |
| 2007/0157228 A1 | 7/2007 | Bayer | |
| 2007/0220056 A1 | 9/2007 | Arora | |
| 2008/0004021 A1 * | 1/2008 | Sanjay | H04L 12/2838 455/436 |
| 2008/0010655 A1 * | 1/2008 | Ellis | H04N 7/163 725/38 |
| 2008/0046917 A1 | 2/2008 | de Heer | |
| 2011/0214148 A1 | 9/2011 | Gossweiler, III et al. | |
| 2012/0323737 A1 | 12/2012 | Pousti et al. | |
| 2013/0014159 A1 | 1/2013 | Wiser et al. | |
| 2016/0156975 A1 | 6/2016 | Boylan et al. | |
| 2016/0360433 A1 * | 12/2016 | Vaderna | H04W 8/005 |
| 2017/0134466 A1 * | 5/2017 | Giladi | H04L 65/1089 |

\* cited by examiner

SYSTEM FOR PRESENTING MEDIA CONTENT

CROSS-REFERENCE TO RELATED APPLICATIONS

This application is a continuation of and claims priority to U.S. patent application Ser. No. 14/755,059 filed Jun. 30, 2015, which is a continuation of U.S. patent application Ser. No. 14/246,415 filed Apr. 7, 2014 (now U.S. Pat. No. 9,100,711), which is a continuation of U.S. patent application Ser. No. 13/912,424 filed Jun. 7, 2013 (now U.S. Pat. No. 8,739,224), which is a continuation of U.S. patent Ser. No. 11/837,769 filed Aug. 13, 2007 (now U.S. Pat. No. 8,484,685), all sections of the aforementioned application(s) and patent(s) are incorporated herein by reference in their entirety.

FIELD OF THE DISCLOSURE

The present disclosure relates generally to media content and more specifically to a system for presenting media content.

BACKGROUND

It is common today for consumers of media content such as music and videos to receive advertisements via email or other communication means. These advertisements typically have Internet links such as a Uniform Resource Identifier (URL) to point the user to a website from which the media content being touted can be purchased. This approach however in some instances can be cumbersome to the consumers because it requires a number of steps to complete a transaction associated with the consumption of the advertised media content.

For instance, media content purchased from a media content portal generally must be downloaded to a computing device such as a desktop computer. In some cases, the consumer may desire presentation of the media content by way of a high fidelity media presentation device such as a set-top box (STB) with surround sound, high definition video, or like media instrumentation. To accomplish this, the consumer must transfer the purchased media to the STB from his/her computing device. By the time the consumer is able to playback the purchased media content at his/her STB, said consumer has undertaken a number of technical steps to reach this point. Similar complexities can arise in setting up media recordings of touted media content by way of a Digital Video Recorder (DVR).

Some consumers ignore messages with URL links to touted media content for lack of technical expertise or because they do not desire to spend the time to undergo steps similar to those described above.

DETAILED DESCRIPTION

In one embodiment of the present disclosure, a computer-readable storage medium can have computer instructions for selecting a media content item for a subscriber, constructing a tout message associated with the media content item, including in the tout message a selectable link comprising a Uniform Resource Locator (URL) with one or more instructions for directing a set-top box (STB) receiver of the subscriber, and transmitting the tout message to a communication device of the subscriber.

In one embodiment of the present disclosure, a communication device can have a controller element to receive a tout message associated with a media content item, and present the tout message with a selectable Internet link having one or more instructions for directing an STB receiver of a subscriber of the communication device.

In one embodiment of the present disclosure, a media content processor can have a controller element to receive one or more instructions for consuming a media content item, wherein the one or more instructions are included in each of one or more selectable Internet links of a tout message transmitted to a communication device of a subscriber of the media content processor.

Figure 1:
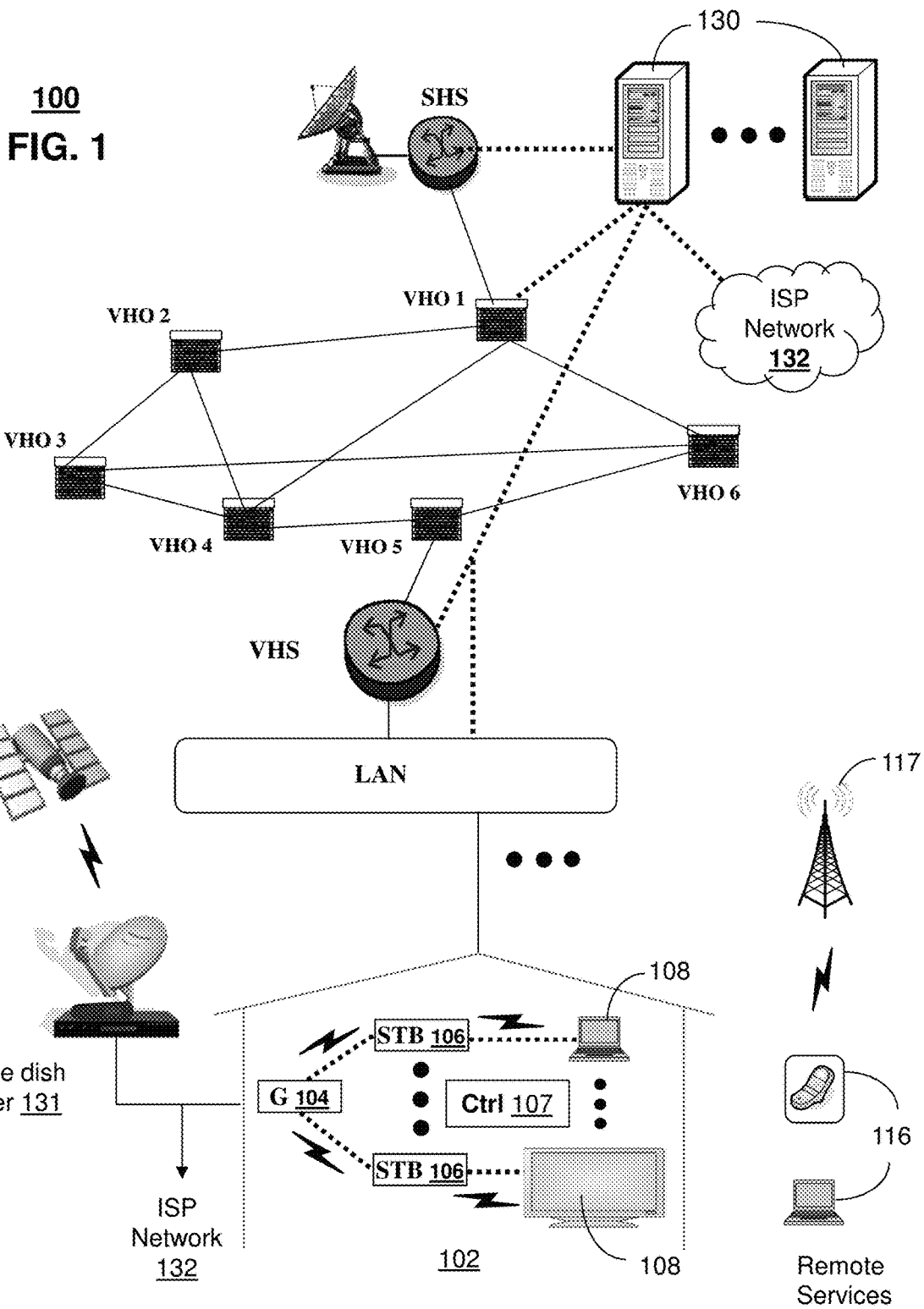
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and/or combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, etc.). The web server 130 can also operate as a tout manager for transmitting tout messages to communication devices of subscribers of communication system 100.

A satellite broadcast system can be used in place of the IPTV media system. In this embodiment, signals transmitted by a satellite 115 can be intercepted by a satellite dish receiver 131 coupled to building 102 which conveys media signals to the media content processors 106 by way of gateway 104. The media content processors 106 can be equipped with a broadband port to the ISP network 132. Although not shown, the communication system 100 can also be combined or replaced with analog or digital broadcast distributions systems such as cable systems. It would be apparent therefore to one of ordinary skill in the art that the present disclosure can be applied to any content media system.

Figure 2:
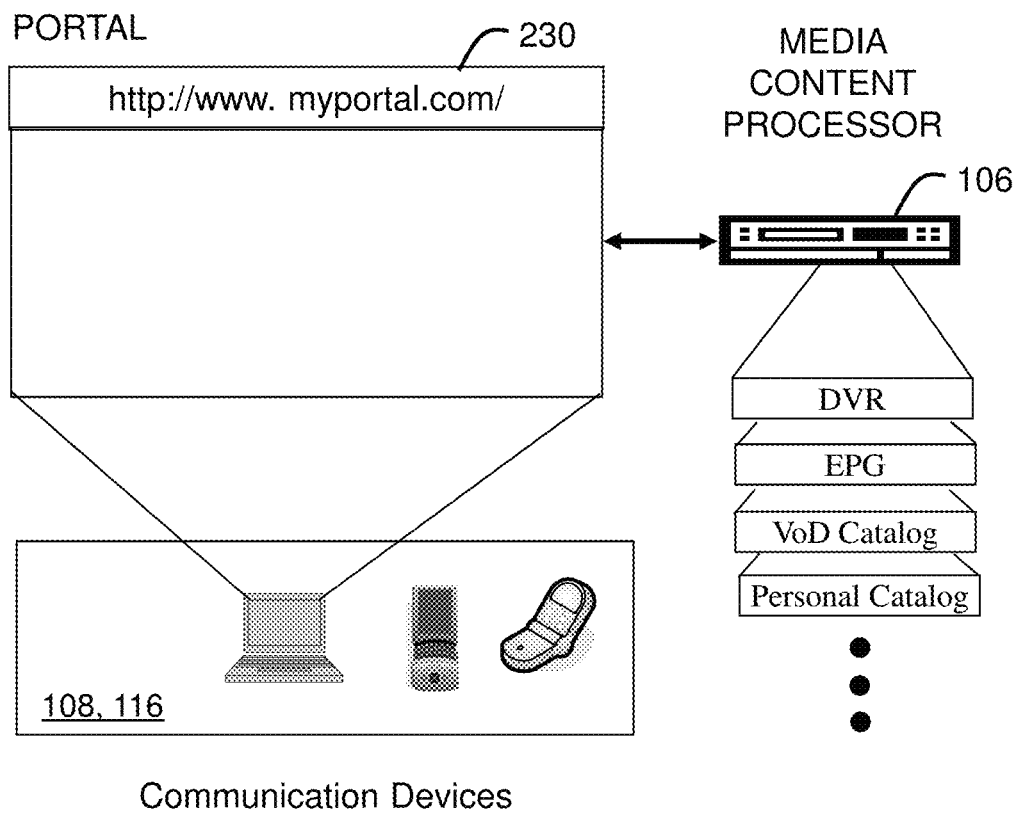
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
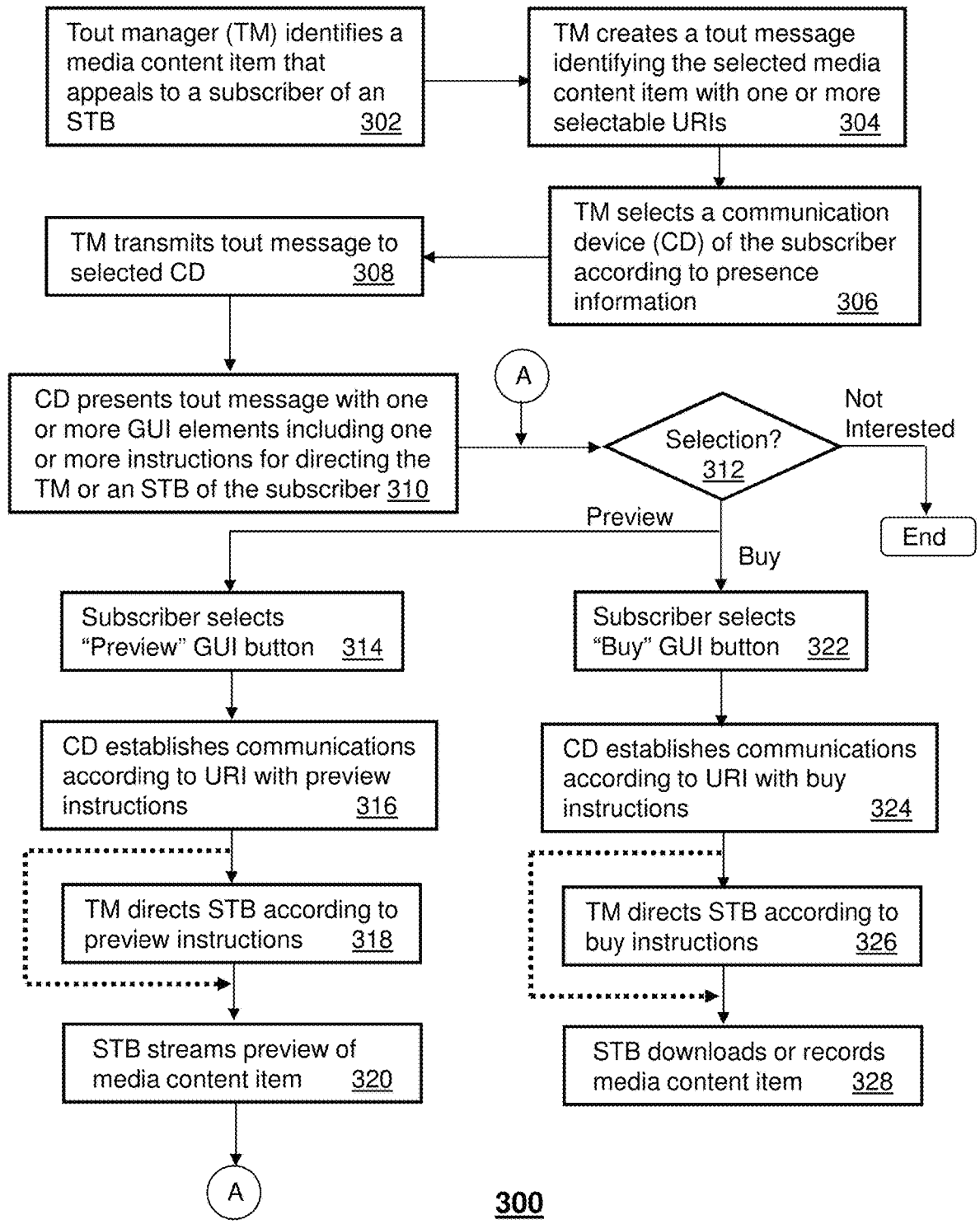
FIG. 3 depicts an exemplary method operating in portions of the communication system.

FIG. 3 depicts an exemplary method 300 operating in portions of the communication system 100. Method 300 begins with step 302 in which a tout manager identified herein by reference 130 identifies a media content item that appeals to a subscriber of an STB 106. The media content item can be identified according to one or more preferences of the subscriber and/or a history of media content consumed by the subscriber. The preferences can be established by the subscriber as settings by way of the portal 230. For example, the subscriber can identify music preferences (e.g., Classical music, artists, groups, etc.) and video preferences (e.g., comedies, action movies, ratings, actors, etc.). The tout manager 130 can also be programmed to monitor the STB 106 of a select subscriber for the content consumed by said subscriber. From a historical collection of monitored consumption, the tout manager 130 can utilize common pattern recognition techniques to identify likes and dislikes of the subscriber.

Based on proactive biases given by the subscriber (i.e., preferences) and/or observed behavior, the tout manager 130 can be programmed in step 302 to search for content that appeals to the subscriber. The tout manager 130 can search an EPG, a VoD catalog, pod casts, or the Internet in general for content that may be of interest to the subscriber. From metadata associated with media content found by the tout manager 130 in step 302, a tout message can be created in step 304 identifying the selected media content item (e.g., a new release of Matrix IV found in a VoD catalog) with one or more selectable Uniform Resource Identifiers (URIs). The URI can correspond to a Uniform Resource Identifier (URL) incorporating one or more instructions for directing the STB 106 of the subscriber on how to for example extract and process the media content item being touted. Alternatively, the URI can be represented by a Session Initiation Protocol (SIP) URI with similar instructions.

In step 306, the tout manager 130 can be programmed to select a communication device 108 or 116 of the subscriber according to presence information associated therewith. Computing devices 130 of FIG. 1 can also comprise a presence system which monitors by common means the activities and whereabouts of the subscriber. The presence server can for example detect that the subscriber is in transit with a portable communication device 116 by detecting a handover transition between base stations 117 and/or by receiving location coordinates from the portable communication device using a Global Positioning System (GPS) receiver incorporated therein. The presence system can also detect that the subscriber is utilizing a communication device 108 in building 102 based on network activity emanating from said communication device or being consumed thereby. With this information in hand, the touting manager 130 can select a communication device 108 or 116 having a predictable likelihood of reaching the subscriber.

Figure 4:
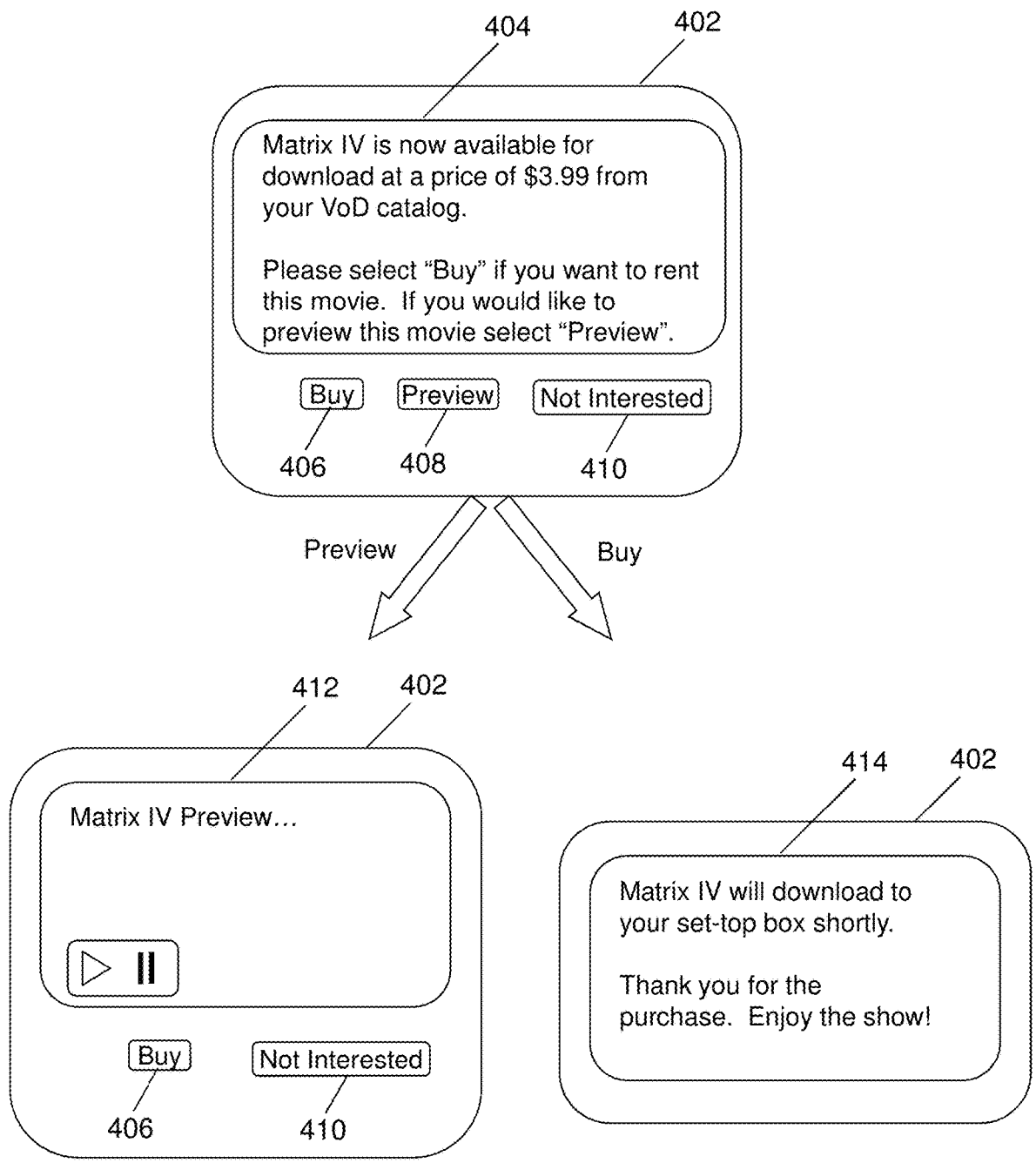
FIG. 4 depicts an exemplary embodiment of Graphical User Interface (GUI) windows presented by a communication device of the communication system according to the method of FIG. 3.

Once a communication device 108 or 116 is selected, the tout manager 130 transmits in step 308 the tout message to said device. The transmission can be a wireline or wireless transmission. Additionally, any communication medium can be used for said transmission such as for example a wireless multimedia messaging service (MMS) message, a message transmitted over a Rich Site Summary (RSS) feed, an email or other form of messaging technique suitable for the present disclosure. Upon receiving the tout message, the communication device 108 or 116 presents in step 310 the tout message with one or more GUI elements as shown in FIG. 4 and awaits a selection in step 312. In this illustration, the GUI elements can represent a GUI window 402 presented on a display of the communication device 108 or 116. A sub-GUI window 404 can present the tout message which could be a text-only message as shown or combined with graphical images (e.g., a movie or music banner).

In this example, the sub-GUI window indicates to the subscriber that the movie Matrix IV is now available for download from a VoD catalog or like source for a given price. The tout also provides an explanation of the actions that the subscriber can take: buy (or rent) the movie (GUI button 406), preview it (GUI button 408), or reject the tout (GUI button 410). Each of these GUI buttons can include a URI with one or more instructions that can be directed to the STB 106 of the subscriber and/or the tout manager 130.

If the subscriber selects by common means through a user interface (e.g., keypad, mouse, navigation disk, joy stick, etc.) of the communication device 108 or 116 to preview the touted media content in step 314, the communication device proceeds to step 316 where it establishes communications according to a URI of GUI button 408 with one or more preview instructions for directing the STB 106 or the tout manager 130. In the case where the URI is used to establish communications with the tout manager 130, the tout manager can decode the URI instructions to direct in step 318 the STB 106 to supply streamed media associated with the media content item identified by the tout message. This step can be the culmination of the STB 106 requesting a trailer of the media content item from a VoD catalog and streaming it in step 320 to the communication device 108 or 116 directly or to the tout manager 130 which redirects it to the communication device.

Alternatively, the URI can be used to establish communications with the STB 106 which processes the preview instructions in the URI. In this embodiment, the streamed media is transmitted by the STB 106 to the communication device 108 or 116 without assistance from the tout manager 130. In yet another embodiment, steps 318 and 320 can be supplanted with a step (not shown) in which the tout manager 130 retrieves the trailer from the VoD catalog and presents it to the communication device 108 or 116 as streamed content.

FIG. 4 depicts a transition when the preview button 408 is selected. In this illustration, a new GUI window 412 is presented by way of a user interface of the communication device 108 or 116. In said window 412 a trailer of the movie is streamed by the STB 106 or the tout manager 130 to the communication device 108 or 116 utilizing an embedded media player operating in a browser application of the communication device. GUI window 412 can have GUI elements such as play and pause buttons for controlling presentation of the movie trailer. The "Buy" GUI button 406 and the "Not Interested" GUI button 410 are presented with the preview GUI window 412 in the event the subscriber wants to purchase or reject the media content being touted. If the subscriber rejects the content, the communication device 108 or 116 can be programmed to terminate the GUI window 402 thereby ending method 300 from step 312.

If on the other hand the subscriber selects to purchase the media content in step 322 with or without previewing it, the communication device 108 or 116 proceeds to step 324 where it establishes communications according to the URI of the Buy GUI button 406 incorporating one or more buy instructions for directing the STB 106 or the tout manager 130. In one embodiment, the tout manager 130 can direct in step 326 the STB 106 to download in step 328 from a VoD catalog or other source the media content item identified by the tout message. Once the subscriber arrives in building 102, s/he can direct by way of the media controller 107 playback of the downloaded media content item. Alternatively, the communication device 108 or 116 can directly communicate the buy instructions to the STB 106 to download the media content item as described above.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that the tout manager 130 can embed in the tout message an Internet link in the form of a URI with instructions for recording a proposed media content item. The presentation of the tout message can be much like that shown in FIG. 4 with the replacement of the Buy GUI button 406 with a Record GUI button. The Preview GUI button 408 can be kept if trailers can be retrieved from a backend system (not shown in FIG. 1). In yet another embodiment, the tout message can be nested so that multiple media content items can be promoted, and/or a media content selection or rejection leads to other tout messages with embedded URI links with associated instructions for the STB 106 to act on the proposed content.

These are but a few examples of modifications that can be applied to the present disclosure without departing from the scope of the claims. Accordingly, the reader is directed to the claims section for a fuller understanding of the breadth and scope of the present disclosure.

Figure 5:
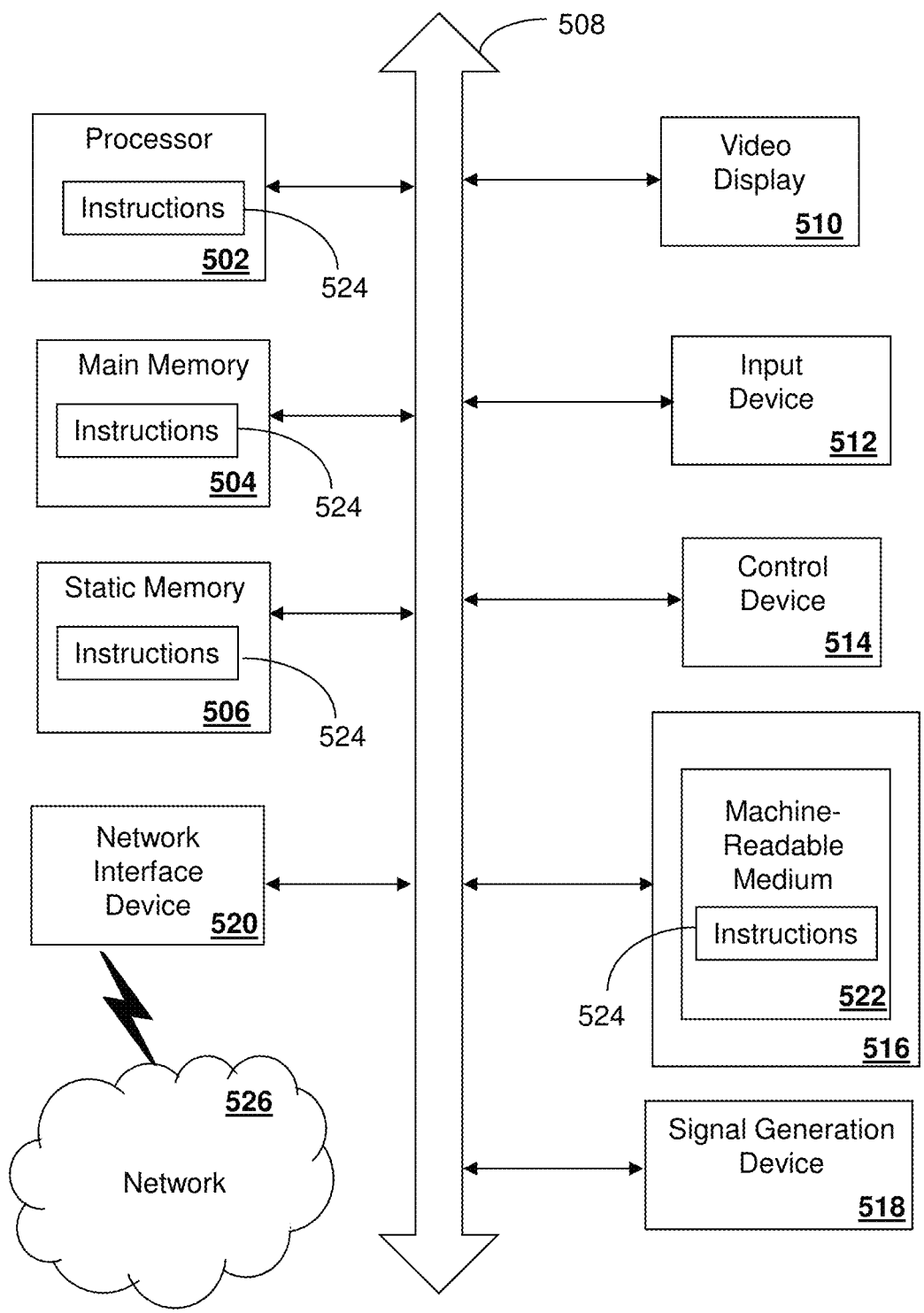
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage device, comprising executable instructions that, when executed by a processing system including a processor, facilitate performance of operations, comprising:
    generating a tout message for a media content, wherein the generating the tout message comprises:
        determining preferences of a subscriber,
        based on the preferences of the subscriber, locating content of interest to the subscriber,
        selecting the media content from the content of interest for the subscriber,
        based on metadata associated with the media content, creating the tout message, the tout message including a Uniform Resource Identifier (URI) corresponding to a Uniform Resource Locator (URL) incorporating instructions for directing a mobile device of the subscriber for extracting and processing the media content;
    identifying the mobile device in response to detecting presence information of the subscriber, wherein the detecting the presence information is based on a first monitoring for a handover transition of the mobile device between a first base station and a second base station and is based on a second monitoring for the subscriber utilizing the mobile device in a building based on network activity by the mobile device, wherein the presence information is detected from at least one of the first monitoring and the second monitoring;
    transmitting the tout message to the mobile device, wherein the transmitting the tout message is responsive to identifying the mobile device, wherein the instructions cause presenting by the mobile device a graphical user interface including the tout message on a display of the mobile device, wherein the instructions of the tout message provide access to a trailer for the media content, and wherein the instructions cause displaying, by the mobile device, of one or more selectable links on the graphical user interface of the mobile device; and
    wherein the instructions of the tout message cause the mobile device to record the media content in response to receiving first user-generated input from the mobile device, wherein the recording the media content comprises recording the media content at the mobile device responsive to a selection of a selectable link of the one or more selectable links by a user of the mobile device.

2. The non-transitory machine-readable storage device of claim 1, wherein the operations comprise providing the trailer to the mobile device in response to receiving second user-generated input from the mobile device.

3. The non-transitory machine-readable storage device of claim 1, wherein the first user-generated input comprises instructions to purchase the media content.

4. The non-transitory machine-readable storage device of claim 1, wherein the operations comprise providing the media content for presentation on the mobile device.

5. The non-transitory machine-readable storage device of claim 1, wherein the detecting of the presence information comprises detecting network activity consumed by the mobile device.

6. The non-transitory machine-readable storage device of claim 1, wherein the detecting of the presence information comprises detecting location coordinates of the mobile device from a Global Position System (GPS) receiver of the mobile device.

7. The non-transitory machine-readable storage device of claim 1, wherein the operations comprise identifying the media content according to the preferences of the subscriber.

8. The non-transitory machine-readable storage device of claim 1, wherein the mobile device presents a graphical user interface, wherein the graphical user interface comprises the tout message, and wherein the graphical user interface further comprises a first user-selectable button corresponding to a first selectable link of the one or more selectable links and a second user-selectable button corresponding to a second selectable link of the one or more selectable links, and wherein a selection of the first user-selectable button causes the mobile device to record the media content and wherein a selection of the second user-selectable button causes the mobile device to display the trailer for the media content.

9. A device, comprising:
a processing system including a processor; and
a memory that stores executable instructions that, when executed by the processing system, facilitate performance of operations, comprising:
generating a tout message for a media content, wherein the generating the tout message comprises:
locating content, including the media content, of interest to a subscriber, wherein the locating the content is based on a history of media content consumed by the subscriber,
selecting the media content for the subscriber,
creating the tout message identifying the media content, wherein creating the tout message comprises including in the tout message a Uniform Resource Identifier (URI) corresponding to a Uniform Resource Locator incorporating instructions for directing a mobile device for extracting and processing the media content;
identifying the mobile device in response to detecting presence information of a subscriber, wherein the detecting the presence information is based on a first monitoring for a handover transition of the mobile device between a first base station and a second base station and is based on a second monitoring for the subscriber utilizing the mobile device in a building based on network activity by the mobile device, wherein the presence information is detected from at least one of the first monitoring and the second monitoring;
transmitting the tout message to the mobile device wherein the transmitting the tout message is responsive to identifying the mobile device, wherein the instructions of the tout message cause presenting by the mobile device a graphical user interface on a display of the mobile device including the tout message, wherein the instructions of the tout message provide access to a trailer for the media content, and wherein the instructions of the tout message cause displaying, by the mobile device, one or more selectable links on the graphical user interface; and wherein the instructions of the tout message cause recording the media content at the mobile device in response to receiving first user-generated input from the mobile device, wherein the receiving the first user-generated input comprises receiving a selection of a first selectable link of the one or more selectable links on the graphical user interface.

10. The device of claim 9, wherein the operations comprise providing the trailer to the mobile device in response to receiving second user-generated input from the mobile device, wherein the receiving the second user-generated input comprises receiving a selection of a second selectable link of the one or more selectable links.

11. The device of claim 9, wherein the first user-generated input comprises instructions to purchase the media content.

12. The device of claim 9, wherein the detecting of the presence information comprises detecting network activity consumed by the mobile device.

13. The device of claim 9, wherein the detecting of the presence information comprises detecting location coordinates of the mobile device from a Global Position System (GPS) receiver of the mobile device.

14. The device of claim 9, wherein the operations comprise identifying the media content according to preferences of the subscriber.

15. The device of claim 9, wherein the mobile device presents a graphical user interface, wherein the graphical user interface comprises the tout message, and wherein the tout message comprises a first user-selectable button corresponding to a first selectable link of the one or more selectable links and a second user-selectable button corresponding to a second selectable link of the one or more selectable links, and wherein a selection of the first user-selectable button causes the mobile device to record the media content at the mobile device and wherein a selection of the second user-selectable button causes the mobile device to display the trailer for the media content.

16. A method, comprising:
generating, by a processing system including a processor, a tout message for a media content, wherein the generating the tout message comprises:
locating content of interest to a subscriber,
selecting the media content from among the content of interest to the subscriber;
creating the tout message, the tout message including a Uniform Resource Identifier (URI) corresponding to a Uniform Resource Locator (URL) incorporating instructions for directing a mobile device of the subscriber for processing the media content;
identifying, by the processing system, the mobile device in response to detecting presence information of a subscriber, wherein the detecting the presence information is based on a first monitoring for a handover transition of the mobile device between a first base station and a second base station and is based on a second monitoring for the subscriber utilizing the mobile device in a building based on network activity by the mobile device, wherein the presence information is detected from at least one of the first monitoring and the second monitoring;
transmitting, by the processing system, the tout message to the mobile device, wherein the transmitting the tout message is responsive to the identifying the mobile device, wherein the instructions of the tout message cause presenting by the mobile device of a graphical user interface including the tout message, wherein the instructions of the tout message cause presenting of a first user-selectable button and a second user-selectable button on the graphical user interface, and wherein the instructions of the tout message provide access to a trailer for the media content responsive to a selection of the first user-selectable button; and wherein the instructions of the tout message cause recording of the media content at the mobile device in response to receiving first user-generated input from the mobile device, wherein the receiving the first user-generated input comprises receiving a selection by a user of the mobile device of the second user-selectable button.

17. The method of claim 16, comprising providing, by the processing system, the trailer to the mobile device in response to receiving second user-generated input from the mobile device, wherein the receiving the second user-generated input from the mobile device comprises receiving a selection by the user of the mobile device of the first user-selectable button.

18. The method of claim 16, wherein the first user-generated input comprises instructions to purchase the media content.

19. The method of claim 18, comprising providing, by the processing system, the media content for presentation on the mobile device.

20. The method of claim 16, further comprising identifying, by the processing system, the media content according to preferences of the subscriber.

* * * * *